(12) United States Patent
Kim et al.

(10) Patent No.: US 11,946,813 B2
(45) Date of Patent: Apr. 2, 2024

(54) BATTERY MODULE DETECTING HIGH TEMPERATURE OF BATTERY CELL AND METHOD FOR DETECTING HIGH TEMPERATURE OF BATTERY CELL

(71) Applicant: LG CHEM, LTD., Seoul (KR)

(72) Inventors: Kyung Jik Kim, Daejeon (KR); Jin Hyun Lee, Daejeon (KR); Young Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 418 days.

(21) Appl. No.: 17/294,727

(22) PCT Filed: Jan. 31, 2020

(86) PCT No.: PCT/KR2020/001538
§ 371 (c)(1),
(2) Date: May 18, 2021

(87) PCT Pub. No.: WO2020/166860
PCT Pub. Date: Aug. 20, 2020

(65) Prior Publication Data
US 2022/0011168 A1    Jan. 13, 2022

(30) Foreign Application Priority Data

Feb. 13, 2019    (KR) .................. 10-2019-0016782

(51) Int. Cl.
*G01K 1/02*    (2021.01)
*G01K 3/00*    (2006.01)
(Continued)

(52) U.S. Cl.
CPC ............. *G01K 1/026* (2013.01); *G01K 3/005* (2013.01); *G01K 3/02* (2013.01); *G01K 7/22* (2013.01);
(Continued)

(58) Field of Classification Search
CPC .......... G01K 1/026; G01K 3/005; G01K 3/02; G01K 7/22; H01M 50/296; H01M 50/569;
(Continued)

(56) References Cited

U.S. PATENT DOCUMENTS 10,008,864 B2    6/2018    Meyer et al.
2014/0222359 A1    8/2014    Ko et al.
(Continued)

FOREIGN PATENT DOCUMENTS

CA    2866944 A1 * 11/2013 .............. B60L 1/003
CN    102792513 A    11/2012
(Continued)

OTHER PUBLICATIONS

Machine Translation of CN-105356007-A (Nov. 21, 2023) (Year: 2023).*
(Continued)

*Primary Examiner* — Matthew J Merkling
(74) *Attorney, Agent, or Firm* — Birch, Stewart, Kolasch & Birch, LLP (57) ABSTRACT

A battery module is composed of a plurality of battery cells according to an embodiment of the present invention and includes one positive output terminal formed by connecting the plurality of battery cells, one negative output terminal formed by connecting the plurality of battery cells, a field effect transistor (FET) provided on a current path between the positive output terminal and an external device, a temperature information measurer for measuring temperature information of the plurality of battery cells, and a protection integrated circuit (IC) chip for controlling the FET.

20 Claims, 4 Drawing Sheets

(51) Int. Cl.
*G01K 3/02* (2006.01)
*G01K 7/22* (2006.01)
*H01M 10/42* (2006.01)
*H01M 10/48* (2006.01)
*H01M 50/296* (2021.01)
*H01M 50/569* (2021.01)
*H01M 50/581* (2021.01)

(52) U.S. Cl.
CPC ......... *H01M 10/425* (2013.01); *H01M 10/48* (2013.01); *H01M 10/486* (2013.01); *H01M 50/296* (2021.01); *H01M 50/569* (2021.01); *H01M 50/581* (2021.01); *H01M 2010/4271* (2013.01); *H01M 2200/105* (2013.01)

(58) Field of Classification Search
CPC .. H01M 50/581; H01M 10/425; H01M 10/48; H01M 10/486; H01M 2010/4271; H01M 2200/105
See application file for complete search history.

(56) References Cited

U.S. PATENT DOCUMENTS

| | | | |
|---|---|---|---|
| 2014/0225622 | A1 | 8/2014 | Kudo et al. |
| 2014/0269811 | A1* | 9/2014 | Maleki ................. G01K 15/005 374/1 |
| 2015/0132615 | A1 | 5/2015 | Yun |
| 2015/0171489 | A1 | 6/2015 | Inaba et al. |
| 2016/0149274 | A1 | 5/2016 | Boddakayala et al. |
| 2016/0315363 | A1 | 10/2016 | Esteghlal |
| 2018/0090949 | A1 | 3/2018 | Lim et al. |
| 2018/0093583 | A1 | 4/2018 | Kim et al. |

FOREIGN PATENT DOCUMENTS

| | | | |
|---|---|---|---|
| CN | 105356007 A | * | 2/2016 |
| JP | 2002-75469 A | | 3/2002 |
| JP | 2003-308887 A | | 10/2003 |
| JP | 2005-151794 A | | 6/2005 |
| JP | 2008-151535 A | | 7/2008 |
| JP | 2010-244844 A | | 10/2010 |
| JP | 5494967 B2 | | 5/2014 |
| KR | 10-2013-0075374 A | | 7/2013 |
| KR | 10-2015-0002633 A | | 1/2015 |
| KR | 10-2015-0102778 A | | 9/2015 |
| KR | 10-2015-0139837 A | | 12/2015 |
| KR | 10-2016-0100953 A | | 8/2016 |
| KR | 10-2016-0109640 A | | 9/2016 |
| KR | 10-2018-0032785 A | | 4/2018 |
| WO | WO 2013/035183 A1 | | 3/2013 |

OTHER PUBLICATIONS

Extended European Search Report for European Patent Application No. 20756586.2 dated May 6, 2022.
International Search Report (PCT/ISA/210) issued in PCT/KR2020/001538 dated May 8, 2020.

* cited by examiner

BATTERY MODULE DETECTING HIGH TEMPERATURE OF BATTERY CELL AND METHOD FOR DETECTING HIGH TEMPERATURE OF BATTERY CELL

The present application is the U.S. National Stage entry of PCT/KR2020/001538, filed Jan. 31, 2020, which claims priority to Korean Patent Application No. 10-2019-0016782 filed in the Republic of Korea on Feb. 13, 2019, the disclosures of which are incorporated herein by reference in their entirety.

TECHNICAL FIELD

The present invention relates to a battery module for detecting a high temperature (i.e., above a predetermined temperature) of a battery cell and blocking the output of the battery module when there is the high temperature and a method for detecting a high temperature of a battery cell.

More specifically, the present invention relates to a battery module for calculating an average temperature by grouping adjacent battery cells to determine whether the battery cells are at a high temperature and a method for detecting a high temperature of a battery cell.

BACKGROUND ART

A general battery module is composed of a plurality of battery cells that can be charged/discharged.

In particular, when a Li-ion battery cell is used for a long time, heat is generated in the battery cell, and in particular, a large-capacity battery module composed of a plurality of battery cells may generate more heat as the amount of current increases during charging or discharging.

As such, when the internal temperature of the battery module rises, a problem may occur in the stability of the battery module.

Therefore, when the temperature of the battery module rises above a predetermined value, charging or discharging of the battery module should be blocked (i.e., stopped).

For this, conventionally, a temperature sensor is provided in each battery cell, and the temperature sensor provided in each battery cell transmits temperature information to an MCU, so that the MCU blocks charging or discharging of the battery module based on the received temperature.

However, since the prior art blocks the output of the battery module only based on the temperature of one battery cell, if a high temperatures occur in only one battery cell, the remaining battery cells are normally more usable but have problems.

Therefore, in order to solve this problem, the present invention proposes to group adjacent battery cells and to block charging or discharging of the battery module based on the average temperature of the grouped battery cells.

(Prior art document) Korea Patent Application Publication KR 2018-0032785 A.

DISCLOSURE OF THE INVENTION

Technical Problem

The present invention provides a battery module for calculating an average temperature by grouping adjacent battery cells among battery cells in the battery module to determine whether the battery cells are at a high temperature and a method for detecting a high temperature of a battery cell.

Technical Solution

A battery module is composed of a plurality of battery cells according to an embodiment of the present invention and includes one positive (+) output terminal formed by connecting the plurality of battery cells, one negative (−) output terminal formed by connecting the plurality of battery cells, a field effect transistor (FET) provided on a current path between the positive (+) output terminal and an external device, a temperature information measurer configured to measure temperature information of the plurality of battery cells, and a protection integrated circuit (IC) chip configured to control the FET.

The protection IC chip may be configured to include a temperature calculation module configured to calculate a temperature of each of the plurality of battery cells based on the temperature information received from the temperature information measurer, a grouping module configured to generate a first temperature group of at least two adjacent battery cells among the plurality of battery cells, an average temperature calculation unit configured to calculate an average temperature of the battery cells included in the first temperature group, and a high temperature determination unit configured to determine whether a temperature of the battery module is above a predetermined temperature based on the calculated average temperature of the first temperature group.

A first end of the temperature information measurer is connected to the negative (−) output terminal, a second end of the temperature information measurer may be connected to the temperature calculation module of the protection IC chip, and the temperature information measurer may include a plurality of negative temperature coefficient (NTC) thermistors connected in parallel to each other.

Each of the plurality of NTC thermistors may include a temperature sensitive dielectric constant changing unit where a dielectric constant increases above a predetermined threshold temperature, and the temperature sensitive dielectric constant changing unit of each of the plurality of NTC thermistors may directly contact a surface of a respective battery cell among the plurality of battery cells.

In response to detecting the temperature of the battery module above the predetermined temperature based on the calculated average temperature, the protection IC chip may be configured to turn off the FET to block charging or discharging of the battery module.

Meanwhile, a plurality of battery modules according to an embodiment of the present invention may be connected to form one battery pack.

Meanwhile, the battery module according to an embodiment of the present disclosure may be mounted in various electronic devices.

A battery module is composed of a plurality of battery cells, and includes one positive (+) output terminal formed by connecting the plurality of battery cells, one negative (−) output terminal formed by connecting the plurality of battery cells, a field effect transistor (FET) provided on a current path between the positive (+) output terminal and an external device, a temperature information measurer configured to measure temperature information of the plurality of battery cells, a protection IC chip configured to control the FET, and a plurality of thermal films, each thermal film surrounding a respective one of the plurality of battery cells.

The protection IC chip may be include a temperature calculation module configured to calculate a temperature of each of the plurality of battery cells based on the temperature information received from the temperature information measurer, a grouping module configured to generate a first temperature group of at least two adjacent battery cells among the plurality of battery cells, an average temperature calculation unit configured to calculate an average temperature of the battery cells included in the first temperature group, and a high temperature determination unit configured to determine whether a temperature of the battery module is above a predetermined temperature based on the calculated average temperature of the first temperature group.

A first end of the temperature information measurer may be connected to the negative (−) output terminal, a second end of the temperature information measurer may be connected to the temperature calculation module of the protection IC chip, and the temperature information measurer may include a plurality of NTC thermistors connected in parallel to each other.

Each of the plurality of NTC thermistors may include a temperature sensitive dielectric constant changing unit where a dielectric constant increases above a predetermined threshold temperature, and the temperature sensitive dielectric constant changing unit of each of the plurality of NTC thermistors may directly contact a respective one of the thermal films.

In response to detecting the temperature of the battery module above the predetermined temperature based on the calculated average temperature, the protection IC chip may be configured to turn off the FET to block charging or discharging of the battery module.

Meanwhile, a plurality of battery modules according to an embodiment of the present invention may be connected to form one battery pack.

Meanwhile, a battery module according to another embodiment of the present disclosure may be mounted in various electronic devices.

A method for detecting whether there is a high temperature of a battery module according to another embodiment of the present invention includes an individual battery cell temperature measurement step of measuring a temperature of each of a plurality of battery cells constituting the battery module, a grouping step of generating a first temperature group of at least two adjacent battery cells among the plurality of battery cells, a group specific average temperature calculation step of calculating an average temperature of battery cells for the first temperature group, a high temperature determination step of determining whether a temperature of the battery module is above a predetermined temperature based on the calculated average temperature for the first temperature group, and a battery module charging/discharging blocking step of turning off the FET of the battery module and blocking charging or discharging of the battery module in response to determining that battery module is above the predetermined temperature in the high temperature determination step.

The high temperature determination step may determine that there is a normal state when the calculated average temperature is less than the predetermined temperature.

The grouping module is further configured to generate a second temperature group of at least two adjacent battery cells different from the battery cells of the first temperature group and the average temperature calculation unit is further configured to calculate an average temperature of the battery cells in the second temperature group.

The high temperature determination unit is configured to determine whether the temperature of the battery module is above the predetermined temperature based on the calculated average temperature of the first temperature group and the calculated average temperature of the second temperature group.

The grouping step further generates a second temperature group of at least two adjacent battery cells different from the battery cells of the first temperature group, and the group specific average temperature calculation step further calculates an average temperature of the battery cells in the second temperature group.

The high temperature determination step determines whether the temperature of the battery module is above the predetermined temperature based on the calculated average temperature of the first temperature group and the calculated average temperature of the second temperature group.

Advantageous Effects

According to the present invention, by grouping adjacent battery cells to calculate an average temperature of the grouped battery cells, the battery cells can be used for a longer time even when only a specific battery cell is at a high temperature.

MODE FOR CARRYING OUT THE INVENTION

Hereinafter, embodiments of the present invention will be described in detail with reference to the accompanying drawings so that those skilled in the art may easily carry out the present invention. The present invention may, however, be embodied in different forms and should not be construed as limited to the embodiments set forth herein. Parts not relating to description are omitted in the drawings in order to clearly describe the present invention and like reference numerals refer to like elements throughout.

Although the terms "initial," "second," etc., may be used herein to describe various elements, these elements should not be limited by these terms. The above terms are used only to distinguish one component from another. For example, an initial component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. The term "~ing operation" or "operation of ~ing" used throughout the specification does not mean "operation for ~ing".

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

1. Battery Module According to an Embodiment of the Present Invention

Figure 1:
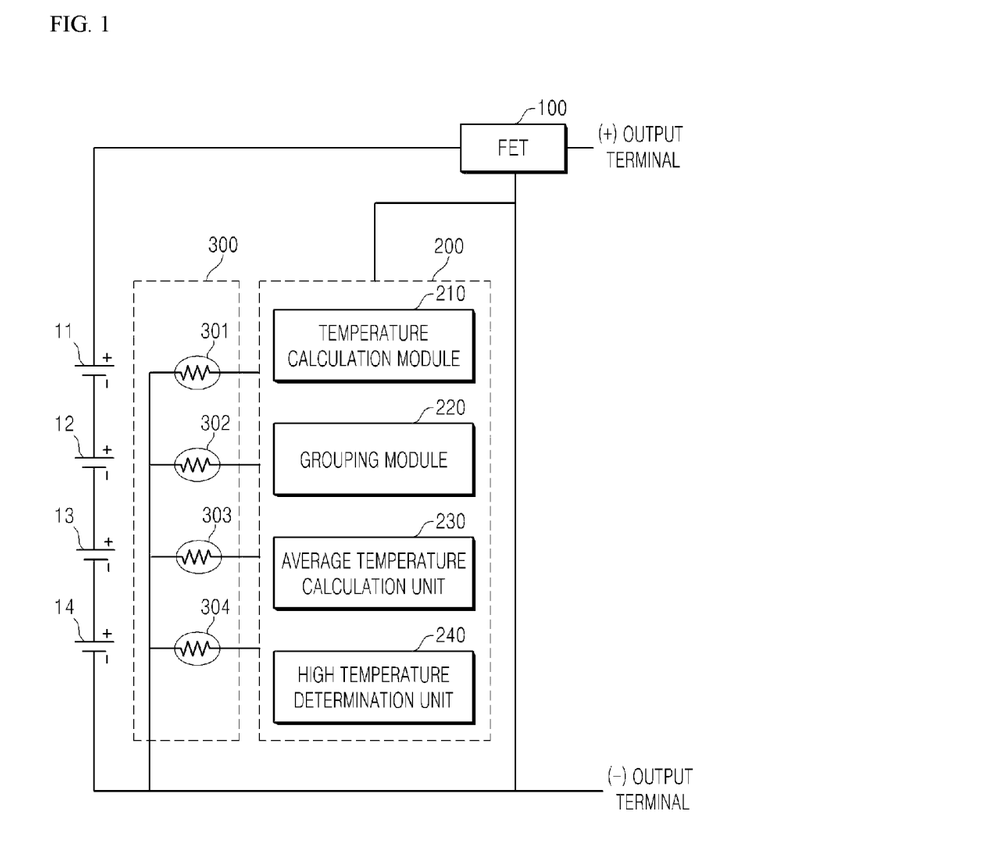
FIG. 1 is a view showing a battery module according to an embodiment of the present invention.

FIG. 1 is a view showing a battery module according to an embodiment of the present invention.

A battery module according to an embodiment of the present invention may be configured to include a plurality of battery cells, one positive (+) output terminal formed by connecting the plurality of battery cells, one negative (−) output terminal formed by connecting the plurality of battery cells, a field-effect transistor (FET) 100 provided on a current path between the positive (+) output terminal and an external device, a temperature information measurement unit 300 for measuring temperature information of the plurality of battery cells, and a protection integrated circuit (IC) chip 200 for controlling the FET 100.

Meanwhile, the protection IC chip 200 may be configured to include a temperature calculation module 210 for calculating temperatures of each of the plurality of battery cells based on the temperature information received from the temperature information measurement unit, a grouping module 220 for generating a group of temperatures calculated by the temperature calculation module 210 into a temperature group of at least two adjacent battery cells, an average temperature calculation unit 230 for calculating an average temperature of battery cells included in the predetermined group, and a high temperature determination unit 240 for determining whether there is a high temperature of the battery module based on the temperature calculated by the average temperature calculation unit 230.

Meanwhile, one end (i.e., a first end) of the temperature information measurement unit 300 is connected to the negative (−) output terminal and the other end (i.e., a second end) of the temperature information measurement unit is connected to the temperature information receiving module of the protection IC chip 200. The temperature information measurement unit 300 may include a plurality of negative temperature coefficient (NTC) thermistors 301 to 304 connected in parallel with each other.

On the other hand, each of the plurality of NTC thermistors 301 to 304 is configured to include a temperature sensitive dielectric constant changing unit in which the dielectric constant increases when the predetermined temperature is above a predetermined threshold, and the temperature sensitive dielectric constant changing unit may be provided to directly contact a surface of each of the plurality of battery cells 11 to 14.

For example, when the first to fourth battery cells 11 to 14 form one module as shown in FIG. 1, the temperature information measurement unit 300 includes first to fourth NTC thermistors 301 to 304, and the first to fourth NTC thermistors 301 to 304 are provided on the surface of each of the first to fourth battery cells 11 to 14, and the first to fourth NTC thermistors 301 to 304 may be connected in parallel with each other.

In other words, the first NTC thermistor 301 is provided on the surface of the first battery cell 11, and one end (i.e., a first end) is connected to the negative (−) output terminal and the other end (i.e., a second end) is connected to the temperature calculation module 210 of the protection IC chip 200. The second NTC thermistor 302 is provided on the surface of the second battery cell 12, and one end (i.e., a first end) may be connected to the negative (−) output terminal, and the other end (i.e., a second end) may be connected to a temperature calculation module 210 of the protection IC chip 200.

The third NTC thermistor 303 is provided on the surface of the third battery cell 13, and one end (i.e., a first end) is connected to the negative (−) output terminal and the other end (i.e., a second end) is connected to the temperature calculation module 210 of the protection IC chip 200. The fourth NTC thermistor 304 is provided on the surface of the fourth battery cell 14, and one end (i.e., a first end) is connected to the negative (−) output terminal and the other end (i.e., a second end) is connected to a temperature calculation module 210 of the protection IC chip 200 so that the first to fourth NTC thermistors 301 to 304 may be connected to each other in parallel.

That is, the protection IC chip 200 may be provided with a temperature calculation module 210 that can receive the temperature information of the first to fourth NTC thermistors 301 to 304 in multiple channels and calculate the respective temperatures of the first to fourth battery cells 11 to 14.

Meanwhile, when there are the first to fourth battery cells 11 to 14, the grouping module 220 groups the temperatures of the first and second battery cells 11 and 12 and generates them as a group (i.e., first group), and groups the temperatures of the third and fourth battery cells 13 and 14 and generates them as another group (i.e., second group).

Then, the average temperature calculation unit 230 calculates an average temperature of the first and second battery cells 11 and 12 included in the first group, and calculates an average temperature of the third and fourth battery cells 13 and 14 included in the second group. A specific method of measuring the temperature of a battery cell may measure the temperature of each of the battery cells 11 to 14 using the plurality of NTC thermistors 301 to 304 described above.

Meanwhile, the technique of measuring the temperature of each of the battery cells using the above-described NTC thermistor may be a known technique or a known conventional technique.

For example, the temperature and current (or voltage) relationship table of the NTC thermistor is stored in the protection IC chip 200. The protection IC chip 200 measures the current (or voltage) of each NTC thermistor and detects the temperature of the respective battery cell by detecting a temperature value matching the measured current (or voltage) in the temperature and current (or voltage) relationship table of the NTC thermistor.

Meanwhile, in relation to the high temperature determination unit 240, when the temperature calculated by the average temperature calculation unit 230 is more than a predetermined reference value, the protection IC chip 200 may determine that a high temperature occurs in the battery module, and turns off the FET 100.

When the FET 100 is off, the battery module may be blocked from charging or discharging.

As such, when the temperature of the battery cells is grouped into a predetermined group and the temperature of the battery module is determined based on the average temperature of each group, more battery modules can be discharged or charged than when a high temperature occurs only in any one battery cell.

Specifically, conventionally, the high temperature is determined based on the battery cell individual temperature, and even when a high temperature is detected only in one battery cell among a plurality of battery cells constituting the battery module, since charging or discharging is blocked, no further battery modules were available.

Figure 2:
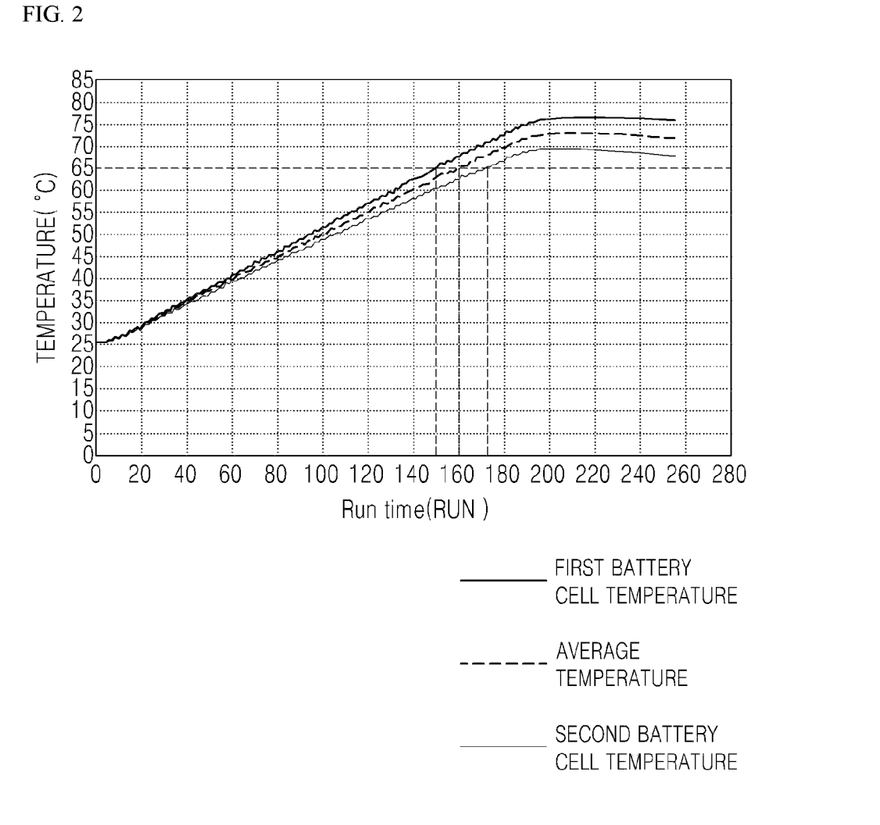
FIG. 2 is a graph showing that a battery module according to an embodiment of the present invention can discharge longer than a conventional battery module.

However, as described above, when the temperature of the battery cells is grouped to calculate the average temperature of the group, as shown in FIG. 2, it is determined to be a high temperature based on one battery cell, but when the average temperature of the group is calculated, it is not determined to be a high temperature. Therefore, charging or discharging can be continued.

For example, if the reference value for high temperature is 65 degrees, in the conventional method, when the first battery cell is detected to have a temperature of 65 degrees and the second battery cell is detected to have a temperature of 60 degrees, the charging or discharging of the battery module is immediately stopped because the first battery cell is at a high temperature (that is, more than a predetermined temperature). However, with the use of the invention of the present invention, when the average temperature of the first and second battery cells is obtained, since a temperature lower than the high temperature reference temperature is calculated as 62.5 degrees, it is not determined to be high temperature so that the battery module may be continuously charged or discharged.

If the battery module operates in this way, in a case that a high temperatures occur in only one battery cell, some of the inefficient problems of not using the rest of the normal battery cells can be solved.

2. Battery Module According to Another Embodiment of the Present Invention

Figure 3:
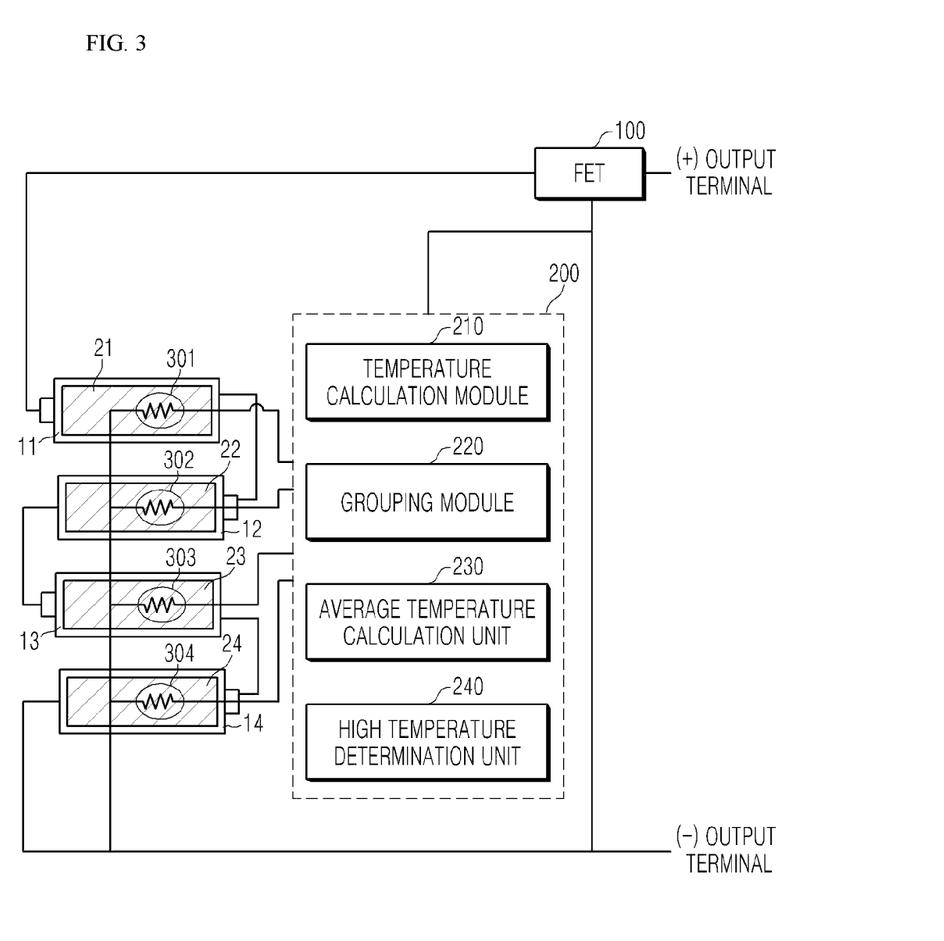
FIG. 3 is a view showing a battery module according to another embodiment of the present invention.

A battery module according to another embodiment of the present invention may be configured to include a plurality of battery cells, one positive (+) output terminal formed by connecting the plurality of battery cells, one negative (−) output terminal formed by connecting the plurality of battery cells, a FET 100 provided on a current path between the positive (+) output terminal and an external device, a temperature information measurement unit 300 for detecting a high temperature of the battery module, a protection IC chip 200 for controlling the FET 100, and a thermal films 21 to 24 surrounding the plurality of battery cells, as illustrated in FIG. 3.

Meanwhile, the protection IC chip 200 may be configured to include a temperature calculation module 210 for calculating temperatures of each of the plurality of battery cells based on the temperature information received from the temperature information measurement unit 300, a grouping module 220 for generating a group of temperatures received by the temperature calculation module 210 into temperature groups of at least two adjacent battery cells, an average temperature calculation unit 230 for calculating an average temperature of battery cells included in the predetermined group, and a high temperature determination unit 240 for determining whether there is a high temperature of the battery module based on the temperature calculated by the average temperature calculation unit 230.

Meanwhile, one end (i.e., a first end) of the temperature information measurement unit 300 is connected to the negative (−) output terminal. The other end (i.e., a second end) of the temperature information measurement unit 300 is connected to a temperature calculation module 210 of the protection IC chip 200. The temperature information measurement unit 300 may be configured to include a plurality of NTC thermistors 301 to 304 connected in parallel with each other.

On the other hand, each of the plurality of NTC thermistors 301 to 304 is configured to include a temperature sensitive dielectric constant changing unit in which the dielectric constant increases when the predetermined temperature is above a predetermined threshold temperature, and the temperature sensitive dielectric constant changing unit may be provided to directly contact a thermal film 21 to 24 surrounding each of the plurality of battery cells.

FIG. 3 is a view showing a battery module according to another embodiment of the present invention.

For example, when the first to fourth battery cells 11 to 14 form one module as shown in FIG. 3, the temperature information measurement unit 300 is configured to include first to fourth NTC thermistors (301 to 304). The first to fourth battery cells 11 to 14 are surrounded by the first to fourth thermal films 21 to 24, respectively. The first to fourth NTC thermistors 301 to 304 are in contact with the surfaces of the first to fourth thermal films 21 to 24. The first to fourth NTC thermistors 301 to 304 may be connected in parallel with each other.

In other words, the first NTC thermistor 301 is in contact with the surface of the first thermal film 21, and one end (i.e., a first end) is connected to the negative (−) output terminal and the other end (i.e., a second end) is connected to the temperature calculation module 210 of the protection IC chip 200. The second NTC thermistor 302 is provided in contact with the surface of the second thermal film 22, and one end (i.e., a first end) may be connected to the negative (−) output terminal and the other end (i.e., a second end) may be connected to the temperature calculation module 210 of the protection IC chip 200.

The thermal NTC thermistor 303 is in contact with the surface of the third thermal film 23, and one end (i.e., a first end) is connected to the negative (−) output terminal and the other end (i.e., a second end) is connected to the temperature calculation module 210 of the protection IC chip 200. The fourth NTC thermistor 304 contacts the surface of the fourth thermal film 24, and one end (i.e., a first end) is connected to the negative (−) output terminal and the other end (i.e., a second end) is connected to the temperature calculation module 210 of the protection IC chip 200 so that the first to fourth NTC thermistors 301 to 304 may be connected in parallel with each other.

That is, the protection IC chip 200 may be provided with a temperature calculation module 210 that can receive the temperature information of the first to fourth NTC thermistors 301 to 304 in multiple channels and calculate a temperature of each battery cell.

Meanwhile, if the thermal film 21 to 24 is wrapped around each battery cell 11 to 14 to detect the temperature of the thermal film 21 to 24, the temperature of the battery cell 11 to 14 may be detected instead of the temperature of the specific point where the NTC thermistor 301 to 304 (or the temperature sensitive permittivity changing unit) is provided.

Meanwhile, when there are the first to fourth battery cells 11 to 14, the grouping module 220 groups the temperatures of the first and second battery cells 21 and 22 and generates them as a group (first group), and groups the temperatures of the third and fourth battery cells 23 and 24 and generates them as another group (second group).

Then, the average temperature calculation unit 230 calculates an average temperature of the thermal films 21 and 22 of the first and second battery cells included in the first group, and calculates an average temperature of the thermal films 23 and 24 of the third and fourth battery cells 13 and 14 included in the second group. A specific method of measuring the temperature of a thermal film of a battery cell may measure the temperature of each of the battery cells using the plurality of NTC thermistors described above.

Meanwhile, the technique of measuring the temperature of a thermal film of each of the battery cells using the above-described NTC thermistor 301 to 304 may be a known technique or a known conventional technique.

For example, the temperature and current (or voltage) relationship table of the NTC thermistor 301 to 304 is stored in the protection IC chip 200. The protection IC chip 200 measures the current (or voltage) of the NTC thermistor and detects the temperature of the battery cell by detecting a temperature value matching the measured current (or voltage) in the temperature and current (or voltage) relationship table of the NTC thermistor 301 to 304.

Meanwhile, in relation to the high temperature determination unit 240, when the temperature of a thermal film 21 to 24 calculated by the average temperature calculation unit 230 is more than a predetermined reference value, the protection IC chip 200 may determine that a high temperature occurs in the battery module, and turn off the FET 100.

When the FET 100 is off, the battery module may be blocked from charging or discharging.

As such, when the thermal film 21 to 24 temperature of the battery cells is grouped into a predetermined group and the temperature of the battery module is determined based on the average temperature of each group, more battery modules can be discharged or charged than when a high temperature occurs only in any one battery cell 11 to 14.

Specifically, conventionally, the high temperature is determined based on a temperature of an individual thermal film 21 to 24 provided in each battery cell 11 to 14, and even when a high temperature is detected only in a thermal film 21 to 24 of one battery cell 11 to 14 among a plurality of battery cells constituting the battery module, since charging or discharging is blocked, no further battery modules were available.

However, as described above, when the temperature of the battery cells is grouped to calculate the average temperature of the group, as shown in FIG. 2, it is determined to be a high temperature based on one battery cell, but when the average temperature of the group is calculated, it is not determined to be a high temperature. Therefore, charging or discharging can be continued.

For example, if the reference value for high temperature is 65 degrees, in the conventional method, when the thermal film 21 of the first battery cell 11 is detected at 65 degrees and the thermal film 22 of the second battery cell 12 is detected at 60 degrees, since the temperature of the thermal film 21 of the first battery cell 11 is 65 degrees or more, which is a reference value of high temperature, the battery module will stop charging or discharging immediately. However, with the use of the invention of the present invention, when the average temperature of the first and second battery cells 11 and 12 is obtained, since a temperature lower than the high temperature reference temperature is calculated as 62.5 degrees, it is not determined to be high temperature so that the battery module may be continuously charged or discharged.

If the battery module operates in this way, in a case that a high temperature occurs in only one battery cell, some of the inefficient problems of not using the rest of the normal battery cells can be solved.

Figure 4:
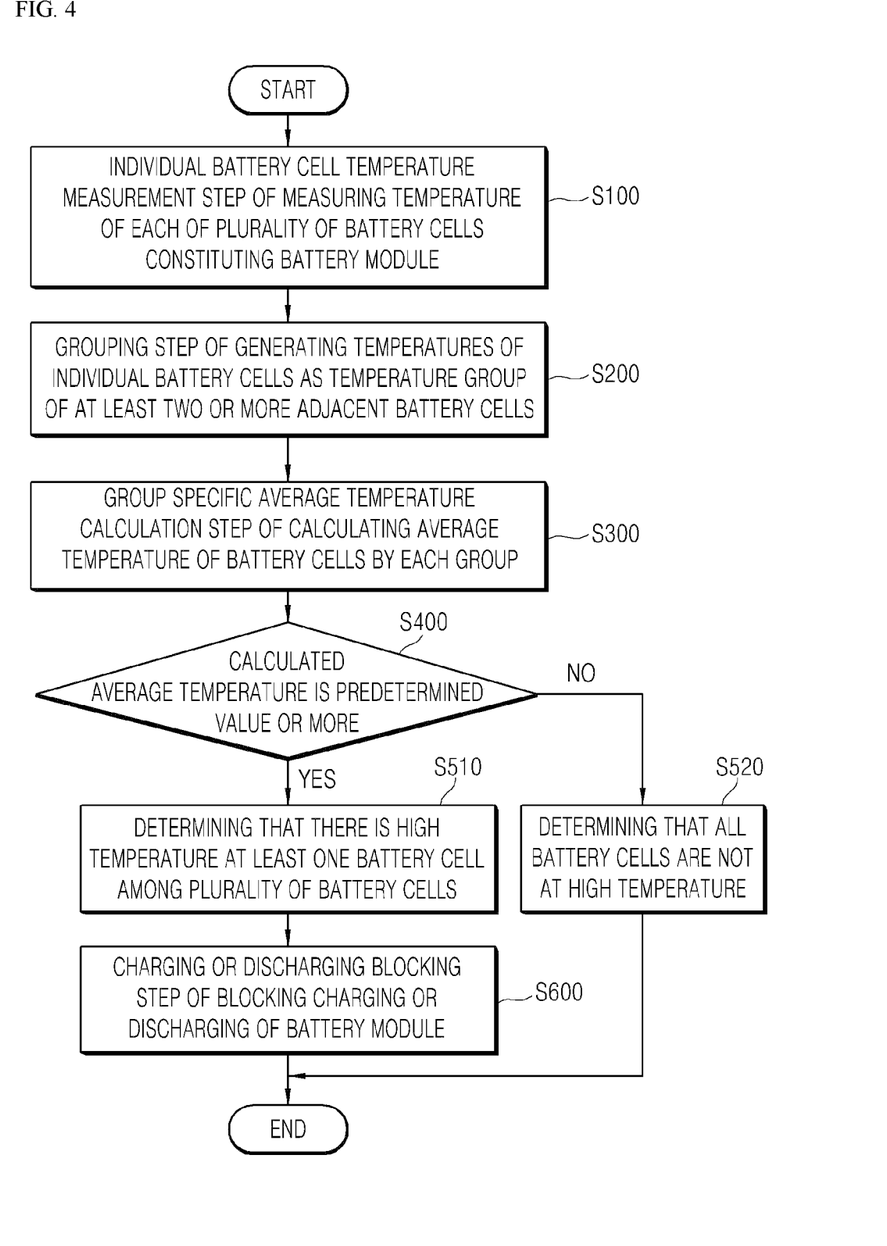
FIG. 4 is a flowchart illustrating a method of detecting a high temperature of a battery module according to another embodiment of the present invention.

3. Battery Module High Temperature Detecting Method According to Another Embodiment of the Present Invention FIG. 4 is a flowchart illustrating a method of detecting a battery module high temperature according to another embodiment of the present invention.

Hereinafter, a method of detecting a battery module high temperature according to another embodiment of the present invention will be described with reference to FIG. 4.

According to another embodiment of the present invention, a method for detecting a high temperature of a battery module may be configured to include an individual battery cell temperature measurement step (S100) of measuring the temperature of each of the plurality of battery cells constituting the battery module, a grouping step (S200) of generating a group of measured temperatures of the individual battery cells as a temperature group of at least two or more adjacent battery cells, a group specific average temperature calculation step (S300) of calculating an average temperature of battery cells for each group, a high temperature determination step (S400) of determining whether there is a high temperature of the battery module based on the calculated average temperature for each group, and a battery module charging/discharging blocking step (S600) of turning off the FET of the battery module to block the charging or discharging of the battery module if it determines there is a high temperature in the high temperature determination step.

When the calculated average temperature is more than a predetermined value, the high temperature determination step (S400) may determine that there is a high temperature (S510), and may determine that there is a normal state (S520) if the calculated average temperature is less than a predetermined value.

However, as described above, when the battery cells are grouped to calculate the average temperature of the group, as shown in FIG. 2, it is determined to be a high temperature based on one battery cell, but when the average temperature of the group is calculated, it is not determined to be a high temperature. Therefore, charging or discharging can be continued.

For example, if the reference value for high temperature is 65 degrees, in relation to the battery module composed of first and second battery cells 11 and 12, in the conventional method, when the first battery module is detected at 65 degrees and the second module is detected at 60 degrees, the charging or discharging of the battery module is immediately stopped. However, with the use of the invention of the present invention, if the average temperature of the first and second battery cells 11 and 12 is obtained, it is not determined as a high temperature with 62.5 degrees so that the battery module may continue to be charged or discharged.

On the other hand, although the technical idea of the present invention is specifically described with reference to the above embodiments, it should be noted that the above embodiments are for the purpose of explanation and not for the purpose of limitation. It will be apparent to those skilled in the art that various modifications and variations may be made in the present invention without departing from the spirit and scope of the invention.

The invention claimed is:

1. A battery module composed of a plurality of battery cells, the battery module comprising:
   one positive output terminal connected to the plurality of battery cells;
   one negative output terminal connected to the plurality of battery cells;
   a field effect transistor (FET) provided on a current path between the positive output terminal and an external device;
   a temperature information measurer configured to measure temperature information of the plurality of battery cells; and
   a protection integrated circuit (IC) chip configured to control the FET, wherein the protection IC chip comprises:
   a temperature calculation module configured to calculate a temperature of each of the plurality of battery cells based on the temperature information received from the information measurer;
   a grouping module configured to generate a first temperature group of at least two adjacent battery cells among the plurality of battery cells;
   an average temperature calculation unit configured to calculate an average temperature of the battery cells included in the first temperature group; and
   a high temperature determination unit configured to determine whether a temperature of the battery module is above a predetermined temperature based on the calculated average temperature of the first temperature group.

2. The battery module of claim 1, wherein a first end of the temperature information measurer is connected to the negative output terminal,
   wherein a second end of the temperature information measurer is connected to the temperature information calculation module of the protection IC chip, and
   wherein the temperature information measurer includes a plurality of negative temperature coefficient (NTC) thermistors connected in parallel to each other.

3. The battery module of claim 2, wherein each of the plurality of NTC thermistors includes a temperature sensitive dielectric constant changing unit where a dielectric constant increases above a predetermined threshold temperature, and
   wherein the temperature sensitive dielectric constant changing unit of each of the plurality of NTC thermistors directly contacts a surface of a respective battery cell among the plurality of battery cells.

4. The battery module of claim 1, wherein in response to detecting the temperature of the battery module above the predetermined temperature based on the calculated average temperature, the protection IC chip is configured to turn off the FET to block charging or discharging of the battery module.

5. A battery module, comprising: battery cells, the battery module comprising:
   a plurality of battery cells;
   one positive output terminal connected to the plurality of battery cells;
   one negative output terminal connected to the plurality of battery cells;
   a field effect transistor (FET) provided on a current path between the positive output terminal and an external device;
   a temperature information measurer configured to measure information of the plurality of battery cells;
   a protection integrated circuit (IC) chip configured to control the FET; and
   a plurality of thermal films, each thermal film surrounding a respective one of the plurality of battery cells,
   wherein the protection IC chip comprises:
   a temperature calculation module configured to calculate a temperature of each of the plurality of battery cells based on the temperature information received from the temperature information measurer;
   a grouping module configured to generate a first temperature group of at least two adjacent battery cells among the plurality of battery cells;
   an average temperature calculation unit configured to calculate an average temperature of the battery cells included in the first temperature group; and
   a high temperature determination unit configured to determine whether a temperature of the battery module is above a predetermined temperature based on the calculated average temperature of the first temperature group.

6. The battery module of claim 5, wherein a first end of the temperature information measurer is connected to the negative output terminal,
   wherein a second end of the temperature information measurer is connected to the temperature calculation module of the protection IC chip, and
   wherein the temperature information measurer comprises a plurality of negative temperature coefficient (NTC) thermistors connected in parallel to each other.

7. The battery module of claim 6, wherein each of the plurality of NTC thermistors includes a temperature sensitive dielectric constant changing unit where a dielectric constant increases is above a predetermined threshold temperature, and
   wherein the temperature sensitive dielectric constant changing unit of each of the plurality of NTC thermistors directly contacts a respective one of the thermal films.

8. The battery module of claim 5, wherein in response to detecting the temperature of the battery module above the predetermined temperature based on the calculated average temperature, the protection IC chip is configured to turn off the FET to block charging or discharging of the battery module.

9. A method for detecting whether there is a high temperature of a battery module, the method comprising:
   an individual battery cell temperature measurement step of measuring a temperature of each of a plurality of battery cells constituting the battery module;
   a grouping step of generating a first temperature group of at least two adjacent battery cells among the plurality of battery cells;
   a group specific average temperature calculation step of calculating an average temperature of battery cells for the first temperature group;
   a high temperature determination step of determining whether a temperature of the battery module is above a predetermined temperature based on the calculated average temperature for the first temperature group; and
   a battery module charging/discharging blocking step of turning off a field effect transistor (FET) of the battery module and blocking charging or discharging of the battery module in response to determining that battery module is above the predetermined temperature in the high temperature determination step.

10. The method of claim 9, wherein the high temperature determination step determines that there is a normal state when the calculated average temperature is less than the predetermined temperature.

11. A battery pack comprising a battery module according to claim 1.

12. An electronic device in which the battery module according to claim 1 is mounted.

13. The battery module of claim 1, wherein the grouping module is further configured to generate a second temperature group of at least two adjacent battery cells different from the battery cells of the first temperature group, and
wherein the average temperature calculation unit is further configured to calculate an average temperature of the battery cells in the second temperature group.

14. The battery module of claim 13, wherein the high temperature determination unit is configured to determine whether the temperature of the battery module is above the predetermined temperature based on the calculated average temperature of the first temperature group and the calculated average temperature of the second temperature group.

15. The battery module of claim 5, wherein the grouping module is further configured to generate a second temperature group of at least two adjacent battery cells different from the battery cells of the first temperature group, and
wherein the average temperature calculation unit is further configured to calculate an average temperature of the battery cells in the second temperature group.

16. The battery module of claim 15, wherein the high temperature determination unit is configured to determine whether the temperature of the battery module is above the predetermined temperature based on the calculated average temperature of the first temperature group and the calculated average temperature of the second temperature group.

17. The method of claim 9, wherein the grouping step further generates a second temperature group of at least two adjacent battery cells different from the battery cells of the first temperature group, and
wherein the group specific average temperature calculation step further calculates an average temperature of the battery cells in the second temperature group.

18. The method of claim 17, wherein the high temperature determination step determines whether the temperature of the battery module is above the predetermined temperature based on the calculated average temperature of the first temperature group and the calculated average temperature of the second temperature group.

19. The method of claim 9, wherein the battery module comprises a plurality of NTC thermistors connected in parallel to each other, each NTC thermistor being connected to a respective one of the plurality of battery cells, and
wherein in the individual battery cell temperature measurement step, the temperature of each of a plurality of battery cells is measured by the plurality of NTC thermistors.

20. The method of claim 19, wherein each of the plurality of NTC thermistors includes a temperature sensitive dielectric constant changing unit where a dielectric constant increases above a predetermined threshold temperature, and
wherein the temperature sensitive dielectric constant changing unit of each of the plurality of NTC thermistors directly contacts a surface of a respective battery cell among the plurality of battery cells.

* * * * *